United States Patent [19]

Lakey et al.

[11] Patent Number: 4,883,973
[45] Date of Patent: Nov. 28, 1989

[54] AUTOMOTIVE ELECTRICAL SYSTEM HAVING A STARTER/GENERATOR INDUCTION MACHINE

[75] Inventors: Leroy E. Lakey, Anderson; David A. Peter, Alexandria; David A. Chance, Noblesville; Stephen W. Anderson, Anderson, all of Ind.

[73] Assignee: General Motors Corporation, Detroit, Mich.

[21] Appl. No.: 227,036

[22] Filed: Aug. 1, 1988

[51] Int. Cl.⁴ .............................................. F02N 11/04
[52] U.S. Cl. ...................................... 290/31; 290/22; 322/29
[58] Field of Search .................... 290/4 R, 10, 22, 31, 290/36 R, 39 R, 46; 322/10, 29

[56] References Cited

U.S. PATENT DOCUMENTS

| | | | |
|---|---|---|---|
| 3,908,161 | 9/1975 | Messenger | 322/29 |
| 3,937,974 | 2/1976 | Lafuze | 290/46 |
| 4,330,743 | 5/1982 | Glennon | 290/46 X |
| 4,481,459 | 11/1984 | Mehl et al. | 290/46 X |
| 4,697,090 | 9/1987 | Baker et al. | 290/4 R |
| 4,743,776 | 5/1988 | Baehler et al. | 290/31 |
| 4,777,376 | 10/1988 | Dishner | 290/38 R X |
| 4,786,852 | 11/1988 | Cook | 290/31 X |

Primary Examiner—William M. Shoop, Jr.
Assistant Examiner—W. E. Duncanson, Jr.
Attorney, Agent, or Firm—Mark A. Navarre

[57] ABSTRACT

A high efficiency automotive electrical system and method of control employing an asynchronous induction machine for performing both starting and generating functions. The induction machine is coupled to the engine through a bimodal gearset which operates as a reduction drive during the starting mode and as a direct drive during the generating mode. A computer-based controller responsive to the battery voltage and the speed of the induction machine maintains given voltage/frequency ratios during both starting and generating to provide efficient operation, and smoothly controls the transition between starting and generating modes. The vehicle electrical loads are supplied at one or more stable voltages produced by a load converter powered by the battery.

5 Claims, 10 Drawing Sheets

| SINE FACTOR \ COUNT | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| SIN 1 | 0 | -.38 | -.71 | -.92 | -1.0 | -.92 | -.71 | -.38 | 0 | -.38 | .71 | .92 | 1.0 | .92 | .72 | .38 |
| SIN 2 | -.87 | -.61 | -.26 | .13 | .50 | .79 | .97 | .99 | .87 | .61 | .26 | -.13 | -.50 | -.79 | -.97 | -.99 |
| SIN 3 | .87 | .99 | .97 | .79 | .50 | .13 | -.26 | -.61 | -.87 | -.99 | -.97 | -.79 | -.50 | -.13 | .26 | .61 |

AUTOMOTIVE ELECTRICAL SYSTEM HAVING A STARTER/GENERATOR INDUCTION MACHINE

This invention pertains to an automotive electrical system employing a single electrical machine for both starting and generating functions, and more particularly to a system in which the machine is an induction machine.

BACKGROUND OF THE INVENTION

Conventional electrical systems for automobiles employing internal combustion engines, generally include one electrical machine (cranking motor) operated as a motor for cranking the engine during starting, and a separate electrical machine (generator/alternator) for generating electricity during operation of the engine.

Over the years, various arrangements have been proposed for performing both starting and generating functions with a single electrical machine, but such arrangements generally suffer from compromised performance or greatly increased complexity, as compared to the systems they replace. Moreover, such arrangements typically do not address the problem of load voltage variation.

SUMMARY OF THE PRESENT INVENTION

The present invention is directed to a high efficiency automotive electrical system and method of control employing an asynchronous induction machine for performing both starting and generating functions. The induction machine is coupled to the engine through a bimodal gearset for bi-directional mechanical energy exchange. The bimodal drive operates as a reduction drive during the starting mode and as a direct drive during the generating mode. A bi-directional multiphase bridge couples the induction machine to the vehicle storage battery for bi-directional electrical energy exchange, and a load converter couples the storage battery to the vehicle electrical loads for energizing the loads with current at predefined, steady voltages.

A computer-based machine controller adjusts the machine excitation amplitude and frequency through the bi-directional bridge to optimize the machine operating efficiency at the desired output level. A computer-based system controller schedules the desired output of the machine as a function of various system parameters, including battery state of charge and the engine operating mode.

DETAILED DESCRIPTION OF THE DRAWINGS

Figure 1:
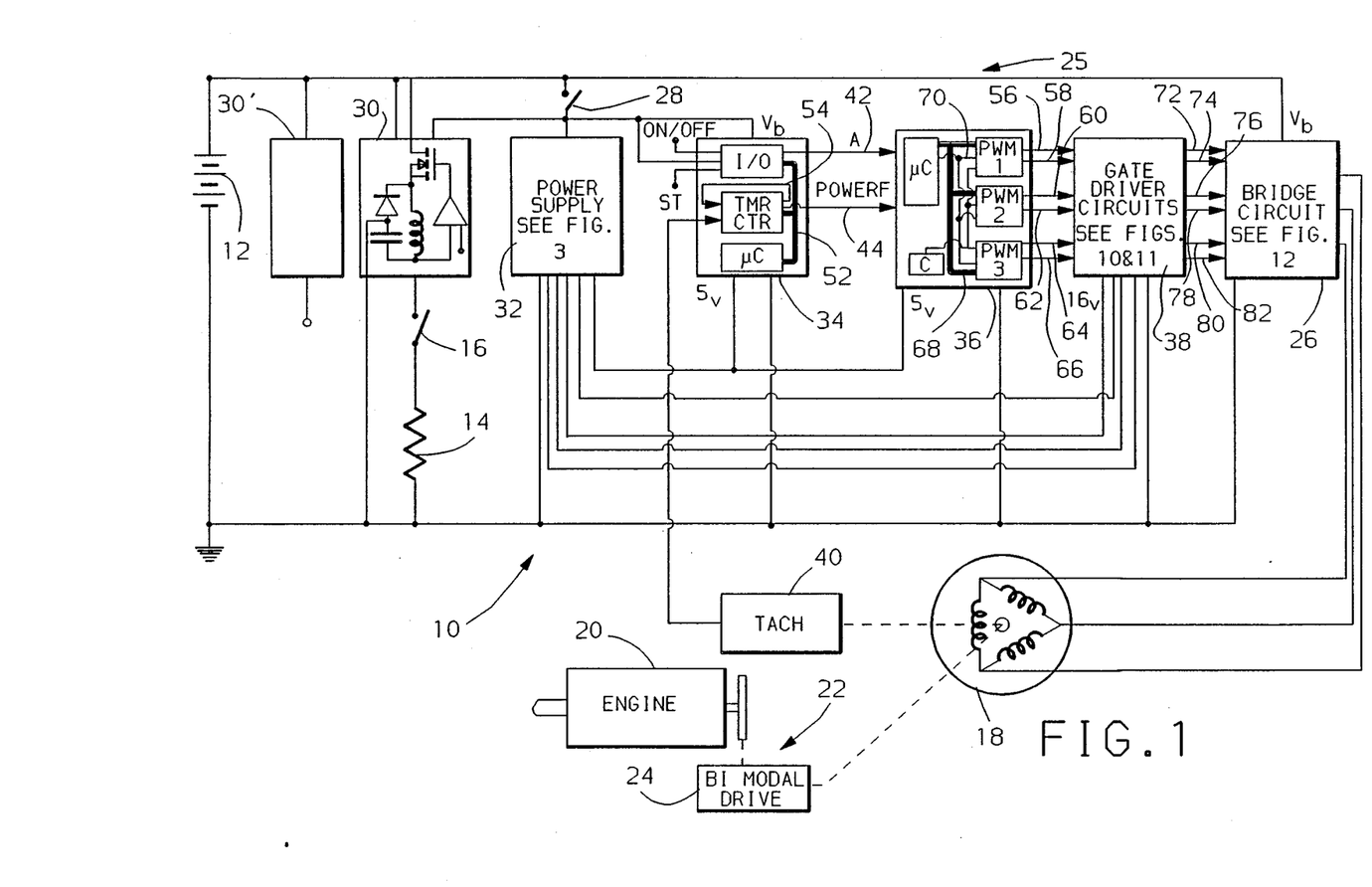
FIG. 1 is a block diagram of an automotive electrical system configured according to the present invention, including a computer-based SYSTEM CONTROL UNIT, a computer-based 3-PHASE PWM GENERATOR, an induction machine and a bimodal drive coupling the induction machine to the automotive engine.

Referring now particularly to FIG. 1, the reference numeral 10 generally designates an automotive electrical system including a storage battery 12 and a plurality of switched electrical loads symbolized by the resistor 14 and the series switch 16. The system 10 additionally includes a 3-phase induction machine 18, which is selectively operated in a motoring mode for cranking the internal combustion engine 20, or a generating mode for supplying electrical current to the battery 12 and electrical loads 14. To this end, the engine 20 is mechanically coupled to the induction machine 18 by the combination of a belt drive 22 and a bimodal planetary drive 24, described below in reference to FIG. 2.

The control system for governing the operation of the above-described system components is designated generally by the reference numeral 25. The battery voltage $V_b$ is supplied directly to bridge circuit 26, and via an ignition switch 28 to load converter 30, power supply 32, a computer-based SYSTEM CONTROL UNIT 34 and the gate driver circuits 38. Regulated output voltages from power supply 32 are supplied to a computer-based 3-phase PWM GENERATOR 36, the gate driver circuit 38 and the SYSTEM CONTROL UNIT 34, as indicated. As described below, the battery voltage is controlled in relation to battery charging requirements, but the load converter 30 (illustrated as a conventional buck converter) supplies a lower, fixed output voltage to the loads 14. Multiple load converter units may be employed for providing multiple load voltages if desired, as indicated by the block 30'.

The rotary speed of induction machine 18 is sensed by a pulse-type tachometer 40, such as the Hewlett Packard HEDS-5500. The tachometer output is provided as an input to SYSTEM CONTROL UNIT 34 along with the battery voltage $V_b$, an ON/OFF input and a START input. The ON/OFF input enables/disables system operation and the START input enables initiation of engine cranking.

In response to the above inputs, the SYSTEM CONTROL UNIT 34 determines whether the motoring or generating mode is appropriate, determines the desired excitation and slip, and outputs amplitude and power frequency control signals A, POWERF to 3-PHASE PWM GENERATOR 36 on lines 42 and 44, respectively.

In the cranking mode, the excitation is ramped up to an optimum level for motoring for smooth quiet starting of the engine 20. Once the engine 20 has started and the generating mode is engaged, the excitation amplitude is ramped up to an optimum generating level for a smooth transition between starting and generating. In this mode, the power frequency is computed according to the sum of the machine rotor speed ROTORSPD and a slip command SLPCMD determined in relation to the amount by which the actual battery voltage $V_b$ differs from a desired voltage reference.

Internally, the SYSTEM CONTROL UNIT 34 comprises a number of conventional devices including an input/output device I/0, a timer/counter device TMR/CTR and a microcomputer uC, all of which are connected to a bus 52. The I/0 device receives the ON/OFF, ST and $V_b$ inputs and generates a machine amplitude command A. The TMR/CTR device operates as an input counter for the TACH signal and as an output counter for the PWMPER output. The TMR/CTR also performs a loop timing function as indicated by the line 54 and as described below. Flow diagrams representative of the program instructions executed by the microcomputer uC in carrying out the control functions referred to above are set forth in FIGS. 4, 5a, 5b and 6.

The 3-PHASE PWM GENERATOR 36 executes a sine function look-up, and provides six low level (5-volt) PWM drive signals to the gate driver circuit 38 on lines 56–66 in accordance with the excitation amplitude and power frequency signals A, POWERF supplied by the SYSTEM CONTROL UNIT 34. Internally, the 3-PHASE PWM GENERATOR 36 comprises a number of conventional devices including a microcomputer uC, three PWM driver devices PWM1, PWM2, PWM3 and a clock C. The PWM1 driver generates the drive signals for the upper and lower switching devices of Phase 1 on lines 56 and 58; the PWM2 driver generates the drive signals for the upper and lower switching devices of Phase 2 on lines 60 and 62; and the PWM3 driver generates the drive signals for the upper and lower switching devices of Phase 3 on lines 64 and 66. The PWM pulse width commands are supplied from the microcomputer uC to the PWM drivers PWM1, PWM2, PWM3 via data bus 68 and device select and handshake line 70. The clock C supplies the PWM drivers with a high frequency clock signal for resolving the PWM pulse width commands. Flow diagrams representative of the program instructions executed by the microcomputer uC in carrying out the control functions referred to above are set forth in FIG. 7.

The gate driver circuits 38 convert the low level PWM drive signals on lines 56–66 to isolated high level (16-volt) signals on lines 72–82 for driving the switching devices of bridge circuit 26.

Bridge circuit 26 is configured for 3-phase full-wave current control of the induction machine 18. In the cranking mode, it excites the 3-phase windings of machine 18 with sinusoidal current of the desired amplitude and frequency from storage battery 12. In the generating mode, it draws sinusoidal load current of the desired amplitude and frequency from machine 18.

Figure 2:
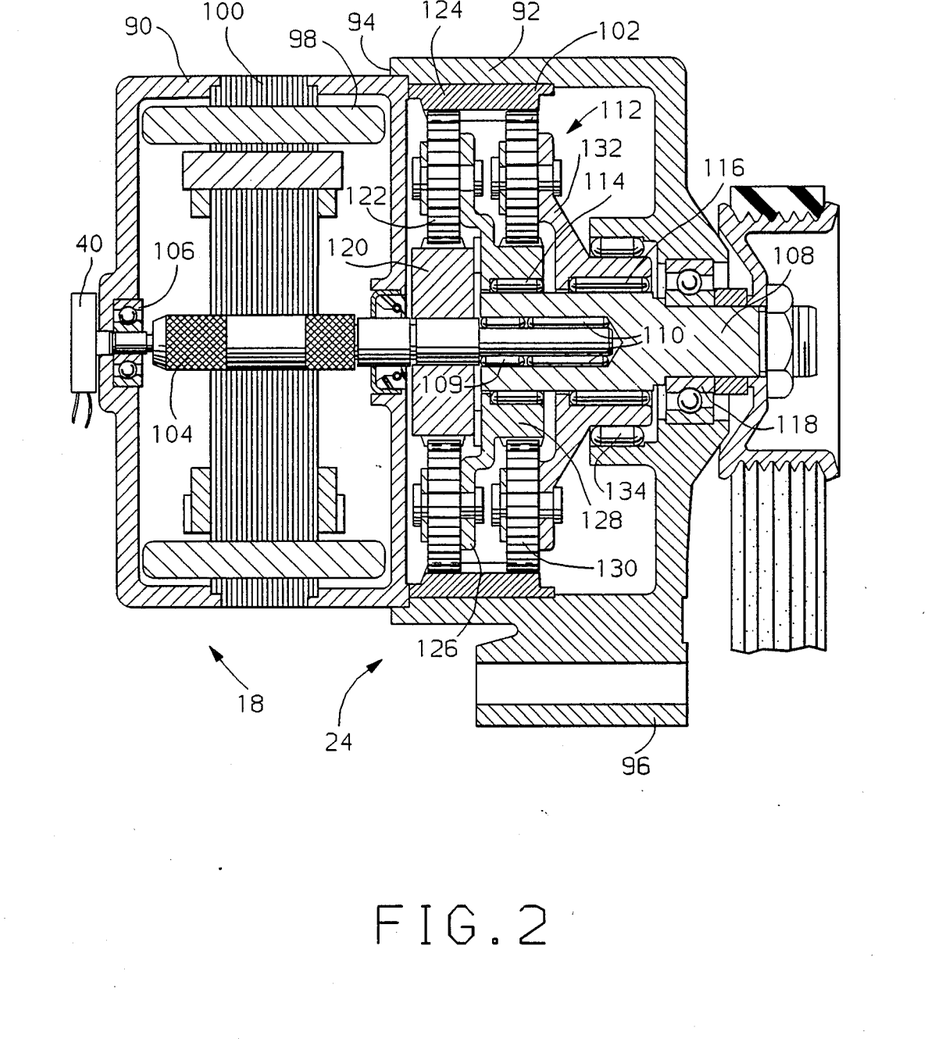
FIG. 2 is a schematic representation of the induction machine and bimodal drive of FIG. 1.

The induction machine 18 and bimodal drive 24 are depicted in greater detail in FIG. 2. As seen in that Figure, the induction machine housing 90 and bimodal drive housing 92 are joined at 94 and adapted to be mounted to engine 20 at the flange 96. Alternately, the drive 24 could be driven directly by the engine crankshaft. The housing 90 supports the stator windings and laminations 98, 100 of machine 18, and the housing 92 supports the ring gear 102 of bimodal drive 24. The outboard end of the machine rotor 104 is rotatably supported by the housing 90 on a ball bearing 106 and drives the tachometer 40 which is mounted on the outboard end of housing 90 as shown. The inboard end of rotor 104 is rotatably supported within the output shaft 108 on a sleeve bearing 109 and a one-way clutch 110. The inboard end of output shaft 108 is rotatably supported by a two-stage planetary gearset 112 on the sleeve bearing 114 and the one-way clutch 116, and the outboard end of output shaft 108 is rotatably supported by a ball bearing 118 mounted in the housing 92.

The two-stage planetary gearset 112 and one-way clutches 110, 116 serve to mechanically couple the motor rotor 104 and the bimodal drive output shaft 108. The output shaft 108 is coupled to the engine crankshaft via a 3:1 belt drive 22, as indicated in FIG. 1. A sun gear 120 pressed onto an intermediate portion of the rotor shaft 104 meshes with the planet gears 122, which in turn mesh with a ring gear 124 mounted on the inner circumference of housing 92. A planet carrier 126 and integral sun gear 128 is supported on the output shaft 108 via the sleeve bearing 114. The sun gear 128 meshes with the planet gears 130, which in turn mesh with the ring gear 102. The planet carrier 132 is coupled to the output shaft 108 via the one-way clutch 116. A sleeve bearing 134 supports the planet carrier 132 with respect to the housing 92.

In engine cranking, the machine 18 is operated as a motor, and the bimodal drive 24 establishes a 10:1 reduction ratio between the rotor and output shafts 104, 108. In this condition, the two-stage planetary gearset 112 is coupled to the output shaft 108 via one-way clutch 116 and the one-way clutch 110 overruns.

Once the engine 20 has started, the output shaft 108 drives the rotor shaft 104 directly via one-way clutch 110 and the one-way clutch 116 overruns. At such point, the machine 18 is operated as a generator for producing electrical energy for battery charging and load energization.

Figure 3:
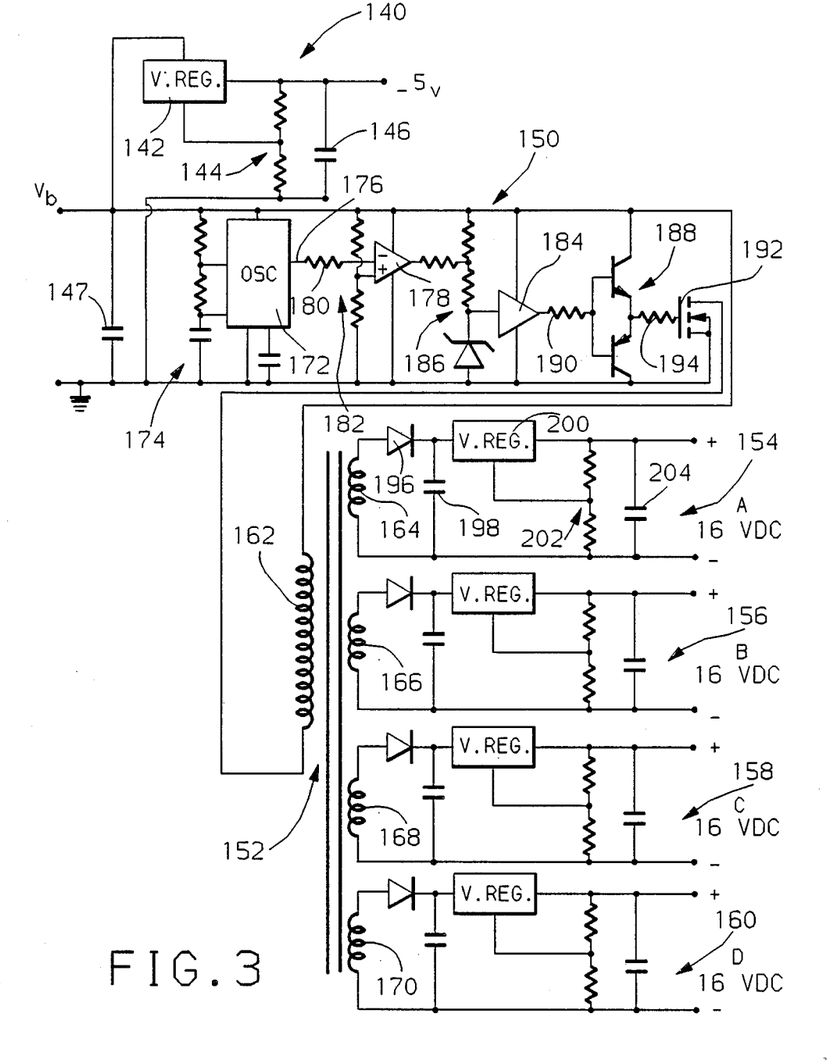
FIGS. 3, 10, 11 and 12 depict circuit diagrams for various blocks set forth in FIG. 1.

The power supply circuit 32 of FIG. 1 is depicted in detail in FIG. 3. As indicated in FIG. 1, the power supply circuit 32 generates a source of 5 VDC for the computer-based controllers 34, 36, and four isolated sources of 16 VDC for the gate driver circuits 38, using the single battery voltage input $V_b$.

The 5 VDC power supply circuit, designated by the reference numeral 140, is defined simply by the voltage regulator 142, the resistive voltage divider 144 and the output filter capacitor 146. The battery voltage $V_b$, filtered by the capacitor 147, is supplied as the input voltage to regulator 142.

The 16 VDC power supply circuits comprise an oscillator circuit 150, a transformer 152 and four isolated voltage regulator circuits 154, 156, 158, 160. The oscillator circuit 150 drives the primary winding 162 of transformer 152, and each regulator circuit 154, 156, 158, 160 is supplied by a transformer secondary winding 164, 166, 168, 170.

The oscillator circuit 150 is built around a timer/oscillator chip 172 (such as the LM555 or equivalent) and associated RC elements 174 which generate a square-wave output of approximately 50 kHz on line 176. The square-wave output is applied to the inverting input of comparator 178 via resistor 180. The inverting comparator input is supplied with an offset reference voltage generated by the resistive voltage divider 182. The output of comparator 178 is applied as an input to the buffer amplifier 184 via a voltage limiting network 186, and the buffer amplifier output, in turn, is applied as an input to the transistor driver pair 188 via the resistor 190. The emitters of the transistors defining the driver pair 188 are joined and connected as an input to power FET 192 via the resistor 194, the source-drain circuit of which is connected in series with the transformer primary winding 162. Thus connected, the above-described elements operate to drive the primary winding 162 with alternating current at the oscillator output frequency of 50 kHz.

The voltage regulator circuits 154, 156, 158, 160 are identical. The turn ratio of each secondary winding 164, 166, 168, 170 with respect to the primary winding 162 is chosen to develop an output voltage of 16 volts DC. Referring to the circuit 154, it will be seen that each regulator circuit comprises a diode rectifier 196 connected in series with the respective secondary winding 164, a filter capacitor 198, a voltage regulator 200 with resistive divider 202 and an output filter capacitor 204. As indicated above, the transformer 152 provides isolation between each of the 16 VDC power supply circuits 154, 156, 158, 160. The various 16 VDC output voltages are designated herein as A+, A−, B+, B−, C+, C−, D+ and D−.

Figure 4:
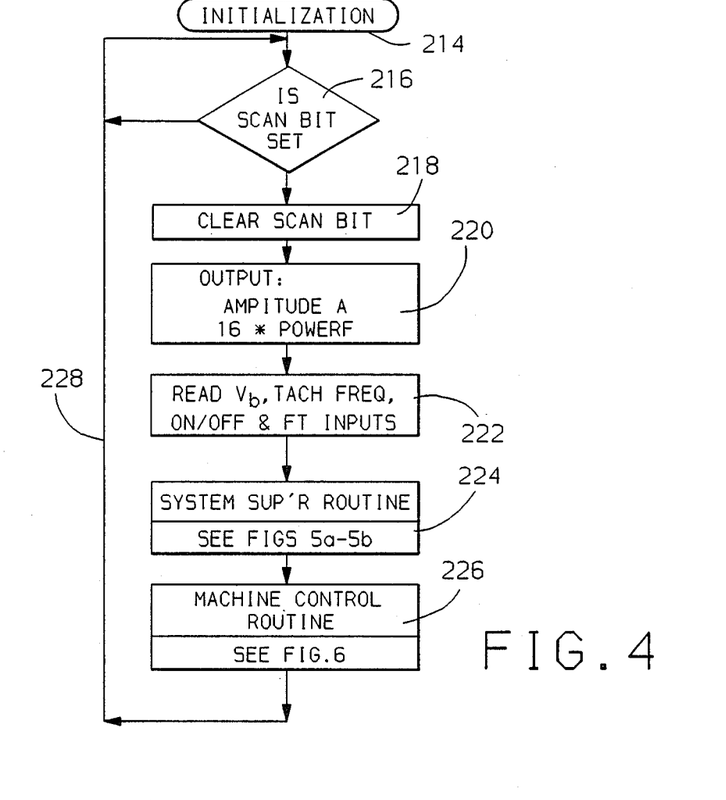
FIGS. 4, 5a, 5b, and 6 depict flow diagrams representative of computer program instructions executed by the SYSTEM CONTROL UNIT of FIG. 1.
Figure 5A:
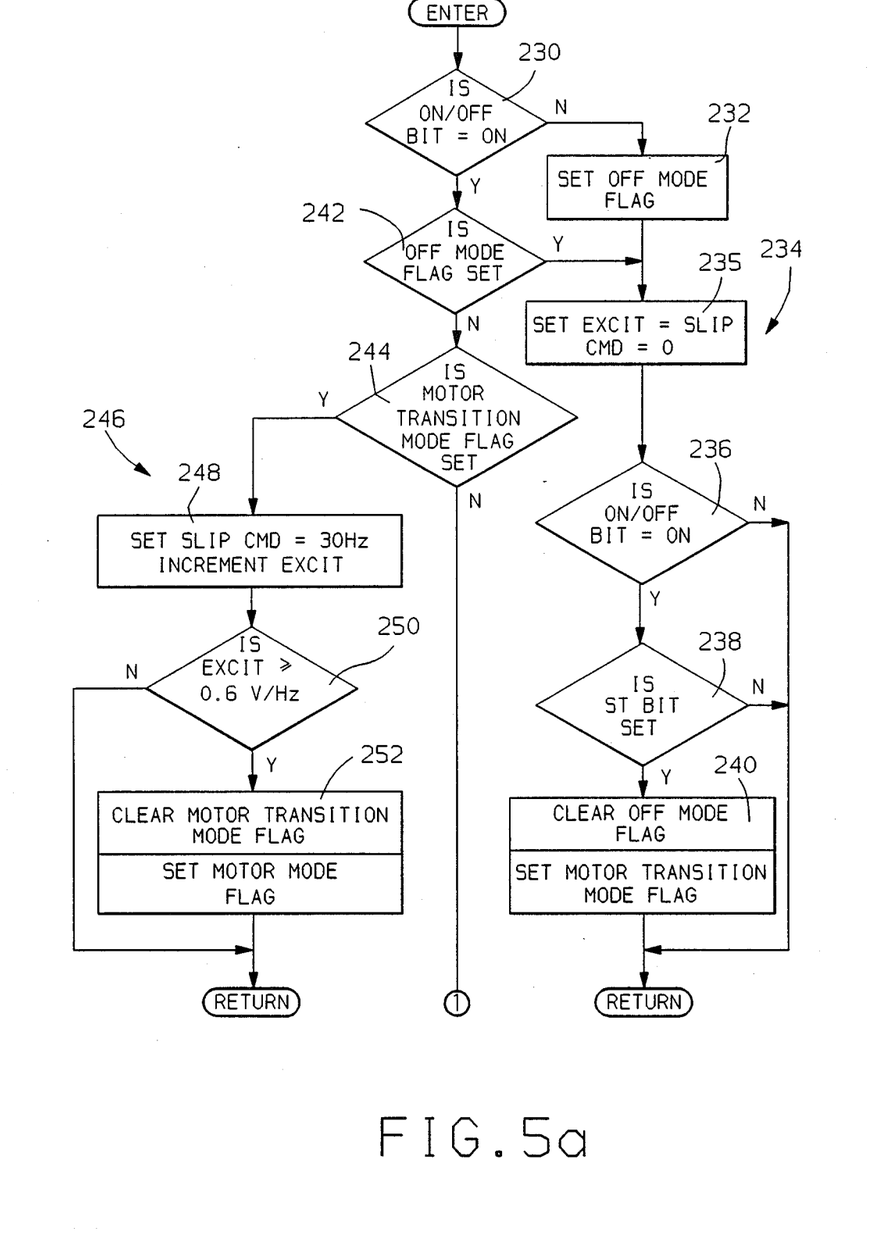
Figure 5B:
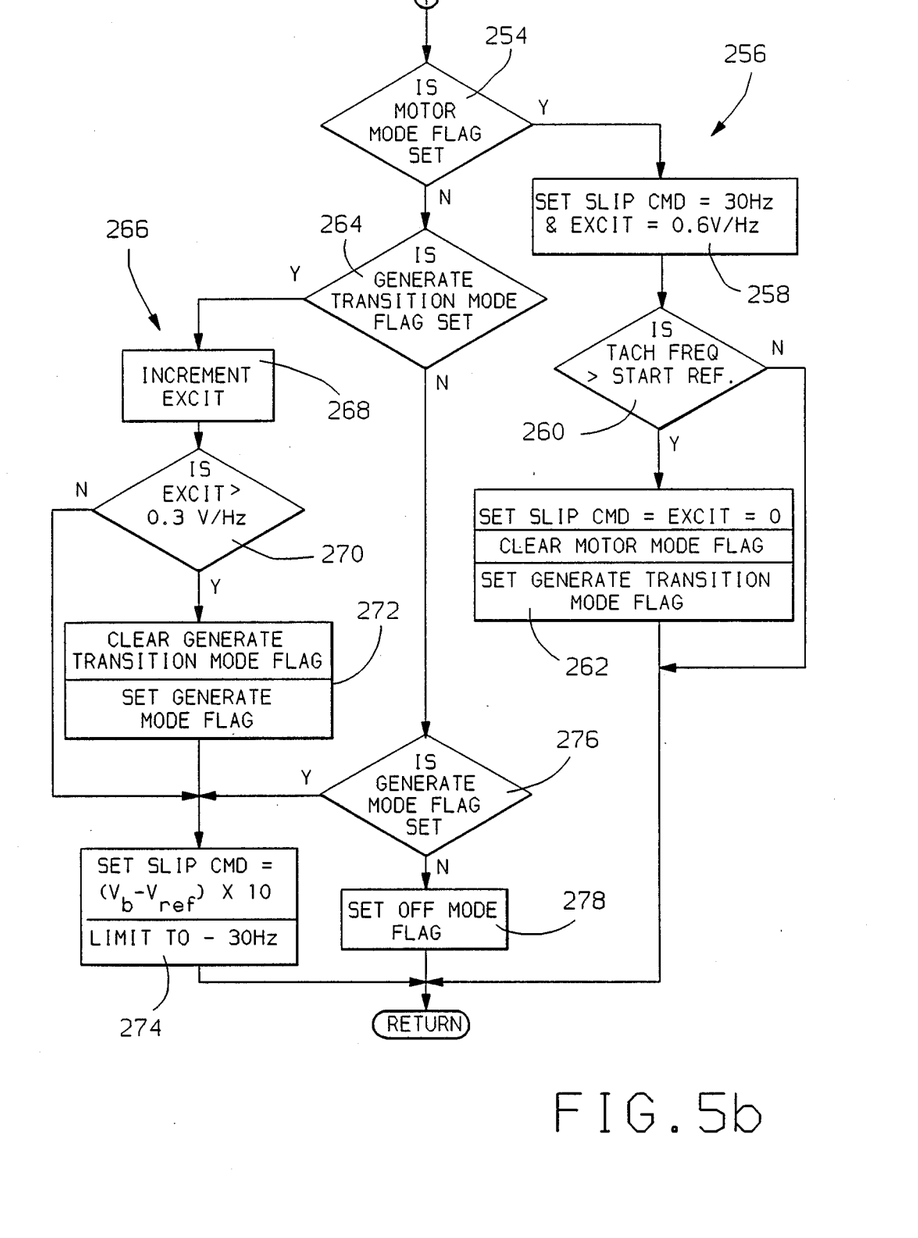
Figure 6:
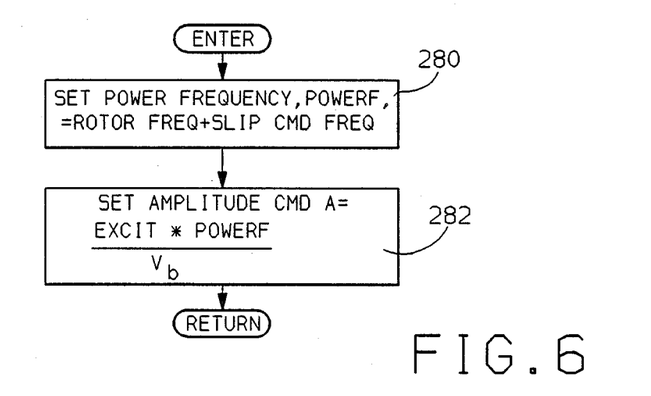

Flow diagrams representative of the program instructions executed by the microcomputer uC of SYSTEM CONTROL UNIT 34 in carrying out the functions referred to above are depicted in FIGS. 4, 5a, 5b and 6. The flow diagram of FIG. 4 depicts a main loop or executive program which reads input values, generates outputs and commands the execution of various routines. The flow diagram of FIGS. 5a and 5b represent a SYSTEM SUPERVISOR routine and the flow diagram of FIG. 6 represents a MACHINE CONTROL routine.

Referring to the main loop flow diagram of FIG. 4, the reference numeral 214 designates a series of instructions executed at the initiation of each period of vehicle operation for initializing the various registers, timers, flags and variables to an initial condition. Thereafter, the decision block 216 is executed to determine if the SCAN bit is set. The SCAN bit refers to an input latch of the SYSTEM CONTROL UNIT TMR/CTR device which receives the low frequency (10 Hz) scan pulses on line 54. The SCAN bit is set on each rising edge of a scan pulse, signaling another execution of the main loop program. As soon as the SCAN bit is set, the instruction blocks 218-226 are executed to clear the SCAN bit, to output the most recent amplitude and frequency values A, POWERF, to read new input values and to execute the SYSTEM SUPERVISOR and MACHINE CONTROL routines. The amplitude command A is generated in the form of an eight-bit word, and the power frequency command POWERF is generated by TMR/CTR in the form of a square wave having a frequency of sixteen times the desired power frequency. The factor of sixteen is used to facilitate generation of sixteen segment sinusoidal gate drive signals by the 3-PHASE PWM GENERATOR 36, as described below. The above process is then repeated, as indicated by the flow return line 228.

Referring now to the SYSTEM SUPERVISOR routine flow diagrams of FIGS. 5a and 5b, the decision block 230 is first executed to determine if the ON/OFF input is set to ON. If not, the instruction block 232 is executed to set the OFF MODE FLAG and the flow diagram portion 234 is executed to set up the OFF mode conditions and to determine if a transition to the motoring mode is appropriate. Instruction block 235 sets the excitation term EXCIT and the slip command SLIP CMD to zero. However, if both the ON/OFF and START bits are set, as determined by decision blocks 236 and 238, the instruction block 240 is executed to set the MOTOR TRANSITION MODE FLAG so that a transition to the motoring mode of machine 18 will occur in the next execution of the system supervisor routine. If the decision block 230 determines that the ON/OFF bit is set and the decision block 242 determines that the OFF MODE FLAG is also set, the flow diagram portion 234 is executed as described above to determine if transition to the motoring mode is appropriate.

If the ON/OFF bit is set and the OFF MODE FLAG is not set, the decision block 242 is executed to determine if the MOTOR TRANSITION FLAG is set. If so, the flow diagram portion 246 is executed to set up the motor transition conditions and to ramp up the machine excitation to a value of 0.6 volts/Hz. Thus, the instruction block 248 sets the machine slip command to 30 Hz and increments the excitation variable EXCIT from its initial zero value. When the excitation value reaches 0.6 volts/Hz as determined at decision block 250, the instruction block 252 is executed to clear the MOTOR TRANSITION MODE FLAG and to set the MOTOR MODE FLAG.

In the next execution of the system supervisor routine following execution of the instruction block 252, the decision block 244 is answered in the negative and the decision block 254 is answered in the affirmative. At such point, the flow diagram portion 256 is executed to set up the motoring conditions and to determine if a transition to the generate mode is appropriate. To this end, the instruction block 258 sets the slip command to 30 Hz and the excitation EXCIT to 0.6 volts/Hz, and the decision block 260 determines if the TACH frequency signal from tachometer 40 is greater than a reference frequency START REF characteristic of engine starting. When the engine starts, decision block 260 will be answered in the affirmative and the instruction block 262 executed to set the slip command and excitation terms to zero, to clear the MOTOR MODE FLAG and to set the GENERATE TRANSITION MODE FLAG.

In the next execution of the SYSTEM SUPERVISOR routine following the execution of instruction block 262, the decision block 254 is answered in the negative and the decision block 264 is answered in the affirmative. At such point, the flow diagram portion 266 is executed to ramp up the machine excitation to the normal generating mode value. To this end, the instruction block 268 is executed to increment the excitation term EXCIT and the instruction block 274 is executed to set the slip command in relation to the difference between the actual battery voltage $V_b$ and the desired battery voltage $V_{ref}$. Once the excitation EXCIT is increased to the nominal generating value of 0.3 volts/Hz, as determined by decision block 270, the instruction block 272 is executed to clear the GENERATE TRANSITION MODE FLAG to set the GENERATE MODE FLAG.

In the next execution of the SYSTEM SUPERVISOR routine following the execution of the instruction block 272, the decision block 264 will be answered in the negative and the decision block 276 will be answered in the affirmative. At such point, the excitation term EXCIT is maintained at the value 0.3 volts/Hz and the slip command continues to be determined as a function of the battery voltage error as indicated at instruction block 274. If the decision block 276 is answered in the negative, the instruction block 278 is executed to set the OFF MODE FLAG, completing the routine.

Referring now to the MACHINE CONTROL routine of FIG. 6, the instruction blocks 280 and 282 are executed to compute the power frequency POWERF and amplitude command A in accordance with the excitation and slip command terms determined by the SYSTEM SUPERVISOR routine. As indicated at instruction block 280, the power frequency term POWERF is determined to the sum of the rotor frequency from tachometer 40 and the slip command frequency determined by the SYSTEM SUPERVISOR routine. As indicated at instruction block 282, the amplitude command A is determined to the product of the power frequency POWERF and the excitation term EXCIT determined by the SYSTEM SUPERVISOR routine, divided by the battery voltage $V_b$. This results in a dimensionless fractional number which has a minimum value of zero and a maximum value of unity.

Figure 7:
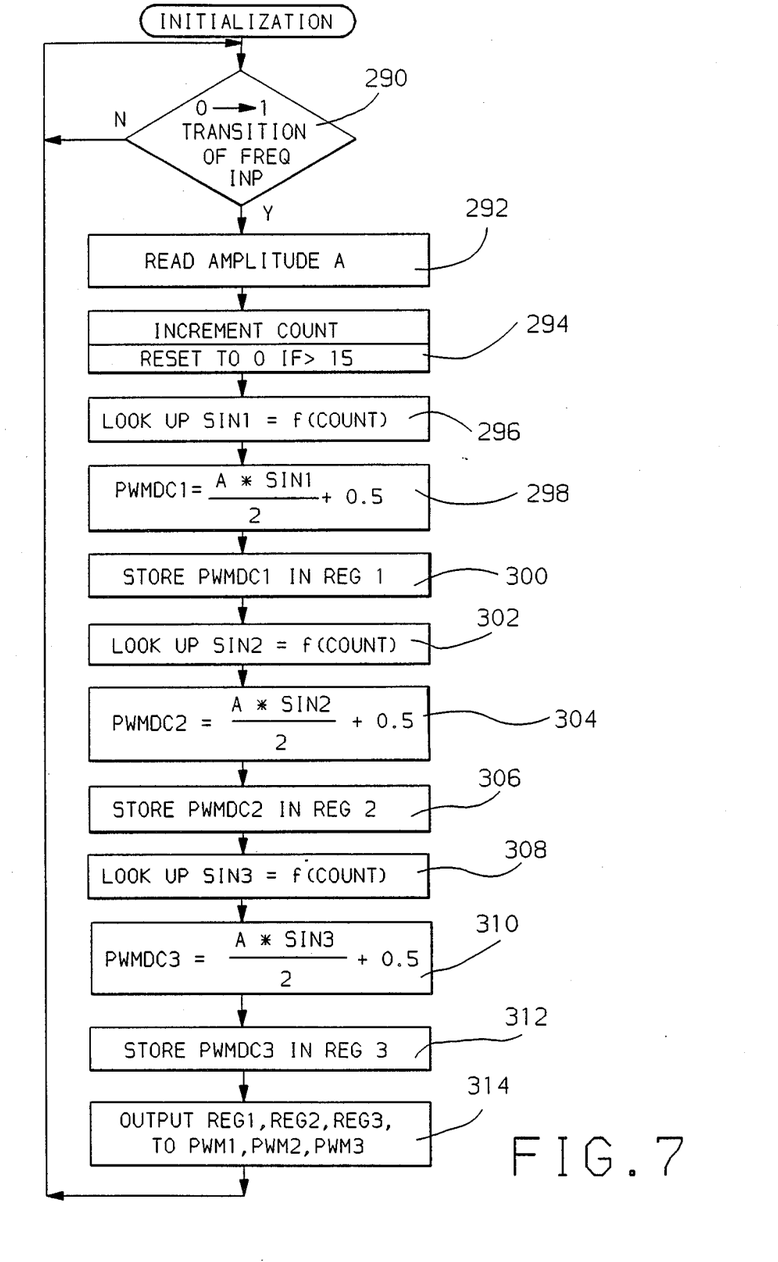
FIG. 7 depicts a flow diagram representative of computer program instructions executed by the 3-PHASE PWM GENERATOR of FIG. 1.

The flow diagrams of FIG. 7 is representative of the computer program instructions executed by the microcomputer Uc of the THREE-PHASE PWM GENERATOR 36. As indicated above, the THREE-PHASE PWM GENERATOR 36 operates in response to the power frequency and amplitude POWERF, A signals from the SYSTEM CONTROL UNIT 34 to generate the six PWM drive signals on lines 56-66. Execution of the routine is triggered by a leading edge transition of the power frequency signal POWERF, as indicated by the decision block 290.

Since the frequency command supplied to the 3-PHASE GENERATOR 36 is 16 times the desired power frequency POWERF, the flow diagram of FIG. 7 is executed 16 times per period of the power frequency. This effectively divides the period of the power frequency into sixteen increments of 22.5 electrical degrees. For each such increment, the 3-PHASE GENERATOR 36 outputs 3-phase PWM duty cycle commands to the PWM drivers PWM1, PWM2, PWM3 according to the product of the amplitude command A and a sine function look-up. The PWM driver outputs, in turn, control the switching devices of the bridge circuit 26 to produce sinusoidal three-phase power voltages and currents in the stator windings of machine 18.

Figure 8:
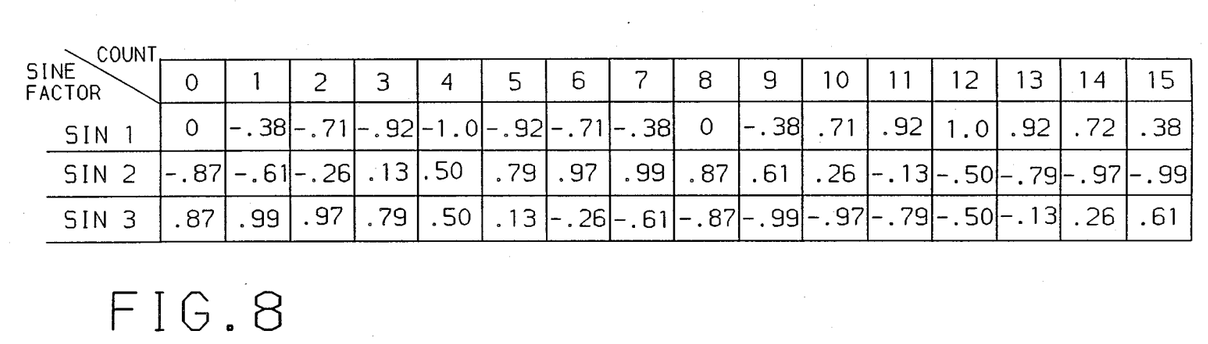
FIGS. 8 and 9 depict data used by the PWM GENERATOR of FIG. 1 in scheduling the motor voltage waveforms.

The frequency command increments a sixteen count counter (COUNT). The sine function look-up, in turn, generates sine factors for the three machine phases SIN1, SIN2, SIN3 based on the COUNT value. Representative sine factors and the corresponding COUNT value are depicted in the chart of FIG. 8.

The PWM duty cycles PWMDC1, PWMDC2, PWMDC3 are then determined according to the expressions:

PWMDC1 = [(A * SIN1)/2] + 0.50

PWMDC2 = [(A * SIN2)/2] + 0.50

Figure 9:
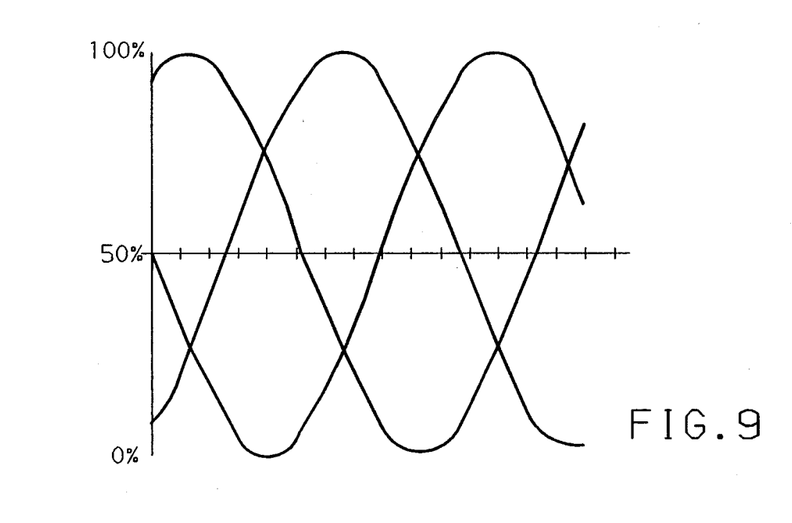

PWMDC3 = [(A * SIN3)/2] + 0.50 where the amplitude A and the respective sine factor SIN1, SIN2, SIN3 each vary between zero and one. A duty cycle offset of 50 percent is employed since zero excitation of the machine occurs when all three phases are operating at a duty cycle of 50 percent. Duty cycles greater than 50 percent produce a positive output voltage; duty cycles less than 50 percent produce a negative output voltage. The three-phase PWM duty cycles for a complete cycle of the power frequency POWERF are graphically depicted in FIG. 9.

Referring to the flow diagram, the instruction blocks 292 and 294 are first executed to read the amplitude term A and to increment the counter term COUNT. The blocks 296-300 are then executed to look-up the phase-one sine factor SIN1 based on the value of COUNT, to compute an offset PWM duty cycle PWMDC1 and to store the computed duty cycle in a temporary register, REG1. The sine factors SIN2, SIN3 and PWM duty cycles PWMDC2, PWMDC3 are similarly determined, as indicated at instruction blocks 302-306 and 308-312, respectively. Then, the instruction block 314 is executed to output the stored duty cycle values PWMDC1, PWMDC2, PWMDC3 to the PWM drivers PWM1, PWM2, PWM3.

As indicated above, the PWM drivers PWM1, PWM2, PWM3 each generate two complementary PWM signals—one for the high side switching device and one for the low side switching device. In each case, the on-time for the high side switching device is equal to the product of the commanded duty cycle (PWMDC) and the period of the switching frequency (1/20 kHz).

Figure 10:
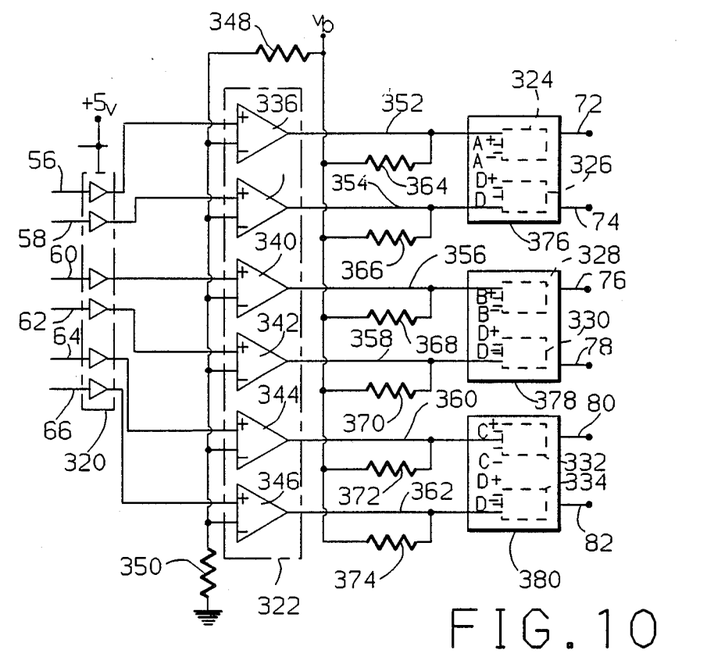
Figure 11:
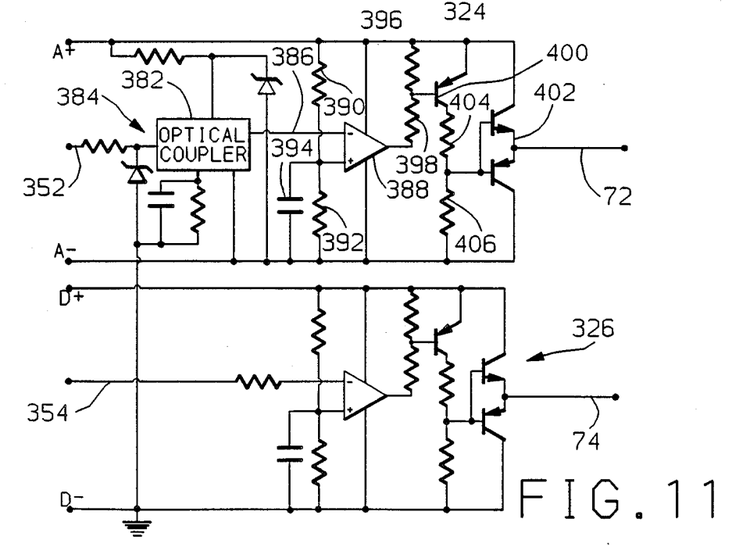

The six PWM driver outputs on lines 56-66 are supplied as inputs to the Gate Driver Circuit 38, which is depicted in detail in FIGS. 10 and 11. Referring to FIG. 10, it is seen that the Gate Driver includes an input buffer 320, a level shifter 322 and six isolated gate driver circuits 324-334. The level shifter circuit 322 comprises six comparators 336-346, each of which receives a low level (5-volt) PWM input and a high level reference voltage developed form battery voltage $V_b$ by the divider resistors 348 and 350. The resulting high level (12/24 volt) PWM outputs on lines 352-362 are maintained normally high by the pull-up resistors 364-374 and are connected as inputs to the driver circuits 324-334, respectively.

The six driver circuit outputs on lines 72-82 are supplied as control inputs to the power devices of the bridge circuit 26 for controlling their conduction. Isolated driver circuits are provided for the high side power devices since the bridge is comprised of all N-channel power devices. Thus, the high-side driver circuits 324, 328 and 332 are each provided with an isolated 16 VDC source from power supply 32, as indicated by the designations A+, A−, B+, B−, C+ and C−. The low-side driver circuits 326, 330 and 334 are provided with the same 16 VDC source, as indicated by the designations D+ and D−. Accordingly, it will be understood that the circuits in each of the blocks 376, 378 and 380 are identical except for input and power supply origin.

A representative PWM driver circuit (block 376) is shown in detail in FIG. 11. Thus, the high level PWM inputs on lines 352 and 354 are supplied to the driver 324 and 326, respectively, and the respective driver outputs are generated on lines 72 and 74. An optical coupler circuit 382 and associated elements 384 are used to reference the high-side PWM input on line 352 to the A+, A− power supply. The D-power supply line for the low-side driver 326 is referenced to battery ground potential, as indicated.

The optically isolated high-side PWM driver output on line 386 is supplied as an input to comparator 388, along with a reference voltage determined by the divider resistors 390, 392 and the capacitor 394. The comparator 388 and resistors 396, 398 bias the transistor 400 on and off in accordance with the PWM driver output. The transistor 400, in turn, biases the output transistor pair 402 on and off via the resistors 404, 406. The emitters of the transistor pair 402 are joined and connected to the driver output line 72. The high-side driver elements 388-406 are essentially repeated in the low-side driver 326 and are not specifically described herein.

Figure 12:
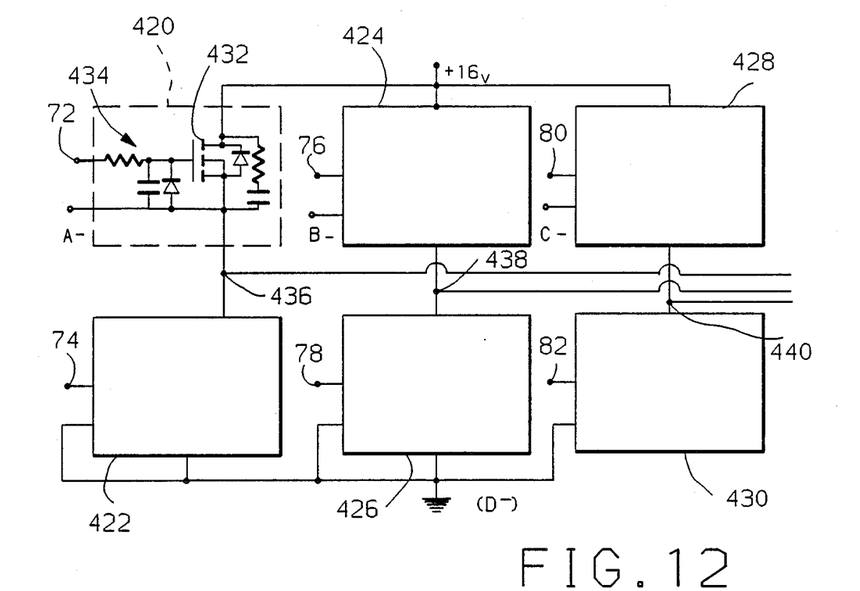

As indicated above, the six driver circuit outputs on lines 72-82 are supplied as control inputs to the power devices of the bridge circuit 26, which is depicted in detail in FIG. 12. Referring to FIG. 12, the bridge circuit 26 comprises six power devices 420-430, each including an N-channel power FET 432 and associated transient protection devices 434, as designated within the power device 420.

The bridge output terminals 436, 438, 440 are connected to the stator windings of induction machine 18 and the bridge circuit power devices 420-430 are pulse-width-modulated such that the machine 18 receives (motoring) sinusoidal current from the battery 12 or supplies (generating) rectified sinusoidal current for battery charging. The control unit 34 varies the excitation/loading during motoring start-up and transition between motoring and generating and ultimately operates the machine 18 substantially at its most efficient level.

Figure 13:
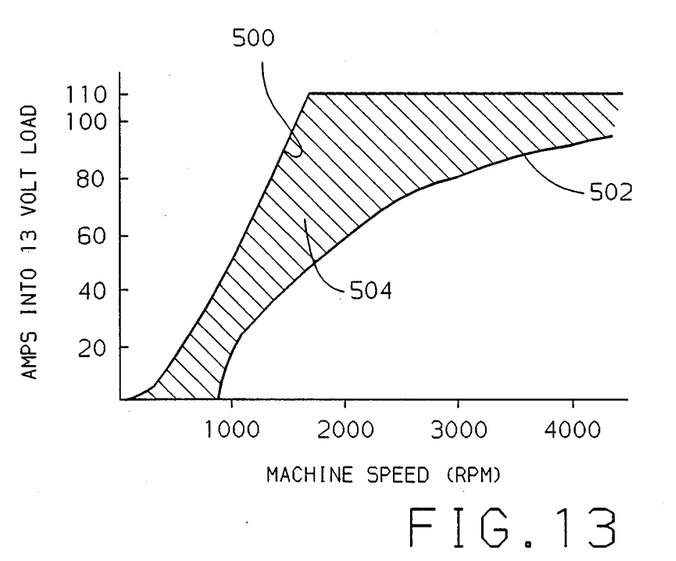
FIG. 13 is a graph depicting the increased generating capacity of the system of this invention, as compared to a conventionally controlled generator.

FIG. 13 depicts the current generating characteristic of the system of this invention (trace 500), compared to that of a conventionally controlled automotive generator (trace 502). In the conventional system, current cannot normally be supplied to the 13-volt battery load until the generator speed is sufficiently high to produce at least 13 volts; this is referred to as the cut-in voltage/speed. Thereafter, the current generating capability is limited by the stator impedance and ultimately cannot exceed a limit value corresponding to the saturation limit of the machine. In the system of this invention, however, the boost capability of the bridge circuit 26 permits current to be drawn from the machine 18 at relatively low speeds. This avoids the limitations due to stator impedance and results in a increased generating capability at lower generator speeds, as indicated by the shaded area 504.

While this invention has been described in reference to the illustrated embodiment, it will be understood that this invention is not limited thereto. For example, the functions of the control unit 34 and PWM GENERATOR 36 may be performed by a single computer-based controller. Numerous other modifications will occur to those skilled in the art, and it will be understood that systems incorporating such modifications may fall within the scope of this invention, which is defined by the appended claims.

The embodiments of the invention i which an exclusive property or privilege is claimed are defined as follows:

1. A motor vehicle electrical system for starting an internal combustion engine and generating electricity for charging a vehicle storage battery and energizing vehicle electrical loads, comprising in combination:
    an induction machine coupled to the engine for bi-directional rotary mechanical energy exchange;
    bi-directional bridge circuit means electrically coupling the storage battery and the induction machine for bi-directional electrical energy exchange;
    control means for controlling the operation of said bridge circuit means (1) in an engine starting mode to operate said bridge as an inverter for energizing said induction machine with substantially sinusoidal voltage derived from the storage battery, and (2) in a generating mode to operate said bridge as a converter for drawing energy from the induction machine for charging the storage battery; and
    load converter means coupled between the storage battery and the electrical loads for drawing current from said storage battery at a predefined load voltage for energizing said electrical loads.

2. A motor vehicle electrical system as set forth in claim 1, wherein:
    the control means includes means effective during said engine starting mode for (1) controlling the power frequency of the induction machine so as to maintain the slip between it and the machine speed at a predefined value, and (2) progressively increasing the magnitude of the energization voltage until the ratio of the energization voltage to the power frequency reaches a predefined value corresponding to substantially optimum motoring efficiency of the machine.

3. A motor vehicle electrical system as set forth in claim 2, wherein:
    the control means includes means effective after the ratio of the energization voltage to the power frequency reaches said predefined value and the machine speed exceeds a reference value indicating that the engine has started for (1) matching the power frequency to the machine speed, and (2) resetting the energization voltage to zero.

4. A motor vehicle electrical system as set forth in claim 1, wherein:
    the control means includes means effective during said generating mode for (1) controlling the power frequency of the induction machine as a function of the machine speed and the battery voltage so as to control the voltage of the storage battery to a reference value, and (2) progressively increasing the magnitude of the energization voltage until the ratio of the energization voltage to the power frequency reaches a predefined value corresponding to substantially optimum generating efficiency of the machine.

5. A motor vehicle electrical system as set forth in claim 4, wherein:
    said means includes means for (1) determining a slip command in relation to the difference between the actual battery voltage and said reference voltage, and (2) computing the power frequency according to the sum of the machine speed and said slip command.

* * * * *